C. APPLE & W. BUTTLER.
MANUFACTURE OF WIRE GLASS.
APPLICATION FILED APR. 27, 1907.

902,849.

Patented Nov. 3, 1908.

2 SHEETS—SHEET 1.

WITNESSES.
W. G. Keller
M. A. Banto

INVENTORS
Charles Apple
William Buttler
by James R. Bakewell
their attorneys

C. APPLE & W. BUTTLER.
MANUFACTURE OF WIRE GLASS.
APPLICATION FILED APR. 27, 1907.
902,849.
Patented Nov. 3, 1908.
2 SHEETS—SHEET 2.
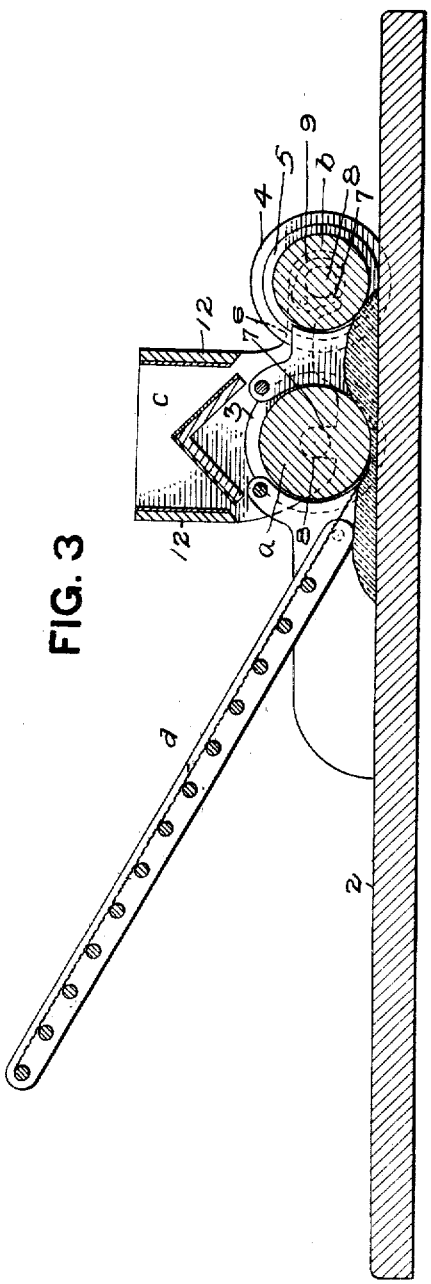
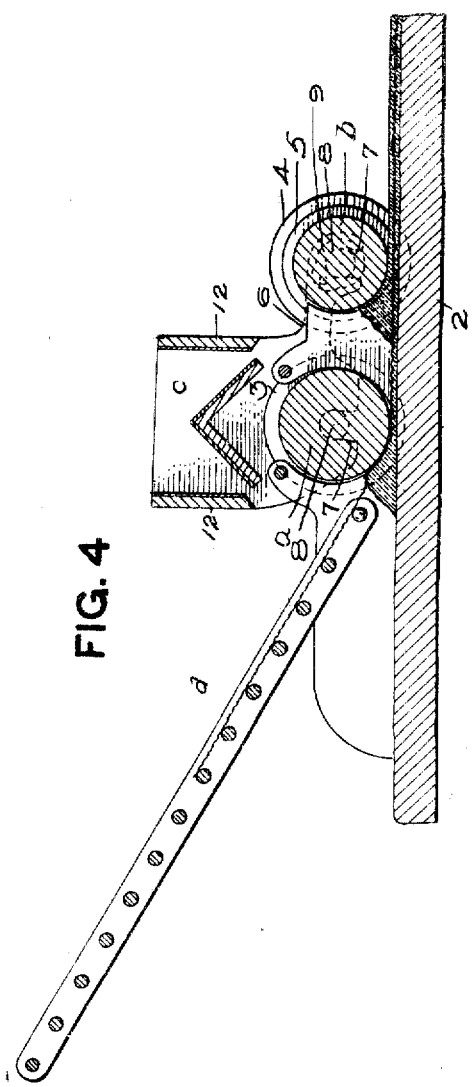
WITNESSES.
INVENTORS.

UNITED STATES PATENT OFFICE.

CHARLES APPLE AND WILLIAM BUTTLER, OF INDIANAPOLIS, INDIANA, ASSIGNORS TO MARIETTA GLASS COMPANY, OF INDIANAPOLIS, INDIANA.

MANUFACTURE OF WIRE-GLASS.

No. 902,849.     Specification of Letters Patent.     Patented Nov. 3, 1908.

Application filed April 27, 1907. Serial No. 370,572.

*To all whom it may concern:*

Be it known that we, CHARLES APPLE and WILLIAM BUTTLER, both of Indianapolis, in the county of Marion and State of Indiana, have invented a certain new and useful Improvement in the Manufacture of Wire-Glass, of which the following is a full, clear, and exact description, reference being had to the accompanying drawings, forming part of this specification, in which—

Figure 1:
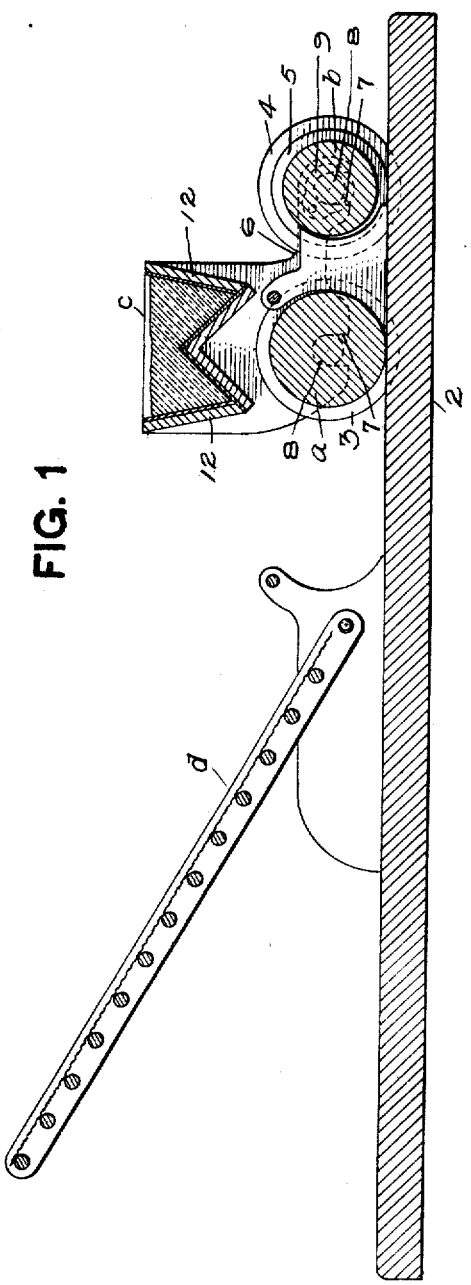
Figure 2:
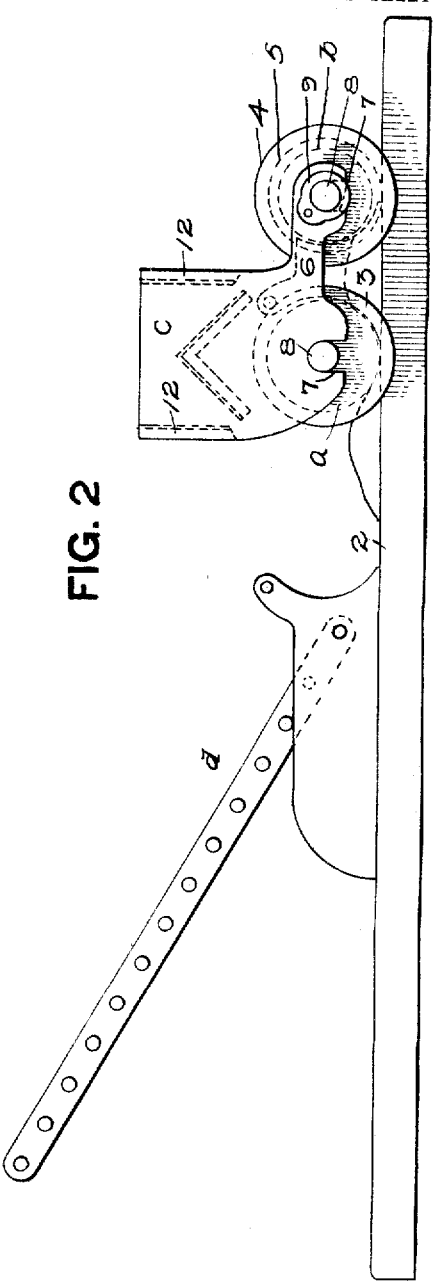

Figure 1 is a vertical sectional view of apparatus illustrating our invention, the hopper and rolls and the supporting chute being separated from each other; Fig. 2 is a side elevation, the hopper being open to permit the passage of the glass in front of the rolls; Fig. 3 is a vertical sectional view, the wire-supporting chute being brought in contact with the first roll; and Fig. 4 is a like view showing the wire-glass during the process of rolling.

Our invention relates to an improvement in the manufacture of wire-glass of the general character that has been described in numerous Letters Patent of the United States and other countries since the year 1887. This wire-glass, which is a well-known article of manufacture, consists generally of wire-netting embedded in a mass or plates of glass, the object being to strengthen the glass and to keep the sheet intact, even when the glass itself has been cracked or shattered by heat or other destructive agency. Although various methods have been employed in the manufacture of wire-glass, these methods have produced, in different degrees, one and the same article of manufacture.

The ordinary method, as practiced today, consists in first forming one sheet of glass on a table, placing the wire-netting upon the sheet while it is hot and in a plastic condition, and then forming a second sheet of glass on top of the wire-netting, the two sheets being sufficiently plastic to weld to each other, thus inclosing the wire-netting in the interior of a single plate or sheet of glass. This sometimes has been accomplished by apparatus consisting of two or more rolls and two batches of molten glass, one of the rolls serving to press the wire-netting into the lower sheet of glass on the table, and the next succeeding roll serving to press the second batch of glass into a sheet on top of the first rolled sheet, thus bringing the wire-netting in the middle of the plate of glass formed by the welding together of the two batches of glass.

The chief difficulties found in the manufacture of wire-glass by this apparatus are the impossibility of properly dividing a single batch of glass into separate portions and the divergence of degree of temperature incident to the pouring of separate batches from separate ladles. Difficulty has also been experienced by the too great separation of the rolls from each other where separate batches are poured on the table, which allows too great and also unequal chilling of the glass during the rolling operation.

The object of our invention is to overcome these objectionable features.

We will now describe our invention so that others skilled in the art may manufacture and use the same.

In the drawings, 2 represents the table, which may be of the form of the ordinary casting table. On this table are mounted the two rolls $a$ and $b$, the one in front of the other, but a short distance apart, and both being provided with end flanges 3 and 4. The face of the first roll $a$ rests directly on the face of the table 2, while the face of the second roll $b$ is elevated above the surface of the table by the collars 5, this elevation being substantially equal to the thickness of the plate to be rolled, and it may be varied by using collars of different thickness. These rolls $a$ and $b$ are connected with each other by the side yokes 6, which are provided with open journal notches 7 adapted to encircle the necks or spindles 8 of the rolls. In order to prevent the yokes 6 from escaping from the necks of the rolls, collars 9 encircle the necks or spindles of the rear roll, which collars are removably pivoted to the yokes 6. Mounted on the yokes 6, and extending from the yoke on one side of the rolls to the yoke on the other is the hopper $c$ adapted to contain sufficient glass to form both sheets, which together form the plate of glass. This hopper may be provided with an inverted V-shaped bottom 10 and with swinging front and rear doors 12 which are pivoted at their outer portion to the ends of the hopper, and in their closed position may be inclined inwardly so that when the doors are released they will simultaneously open by gravity and allow the batch of glass contained in the hopper to be divided into two equal parts by the inverted V bottom 10 and to slide through the open doors, one part in front of the first roll $a$ and the other part in front of the second roll $b$. In front of the first roll, resting on the table 2, is the slidable inclined chute $d$, which serves to support the wire-netting and to direct it against the base of the roll $a$ in rear of that portion of the glass which has been dropped from the forward side of the hopper $c$. Any of the ordinary and well known devices may be employed for imparting movement to the rolls $a$ and $b$ on the table 2.

The operation of our improved apparatus is as follows: The rolls $a$ and $b$ being brought to one end of the table 2, a batch of molten glass is poured into the hopper $c$, and the wire-netting chute, carrying the wire-netting is brought in front of the roller $a$; the doors 12 of the hopper $c$ are then opened, permitting the molten glass, divided in two equal portions by the dividing bottom 10, to pass to the table 2 in front of the rolls $a$ and $b$. The forward movement is then imparted to the rolls $a$ and $b$ and the glass is rolled to a plate having a wire web embedded therein. The first roll $a$ may be provided with annular ribs, such as have been used for many years for forcing the wire-netting into the first batch or sheet of glass.

In order to prevent the glass from sticking to the sides or bottom of the hopper $c$, we may line the hopper with carbon or carbonaceous matter, between which and the molten glass there is less adhesion than there would be between metal and glass.

The advantages of our invention will be appreciated by those skilled in the art. In the use of our invention, the plastic glass is mechanically divided into two equal batches delivered evenly in front of each of the rolls, thus insuring mathematical equality in the amount of glass delivered in front of each of the rolls and also insuring an absolute evenness in the masses of glass from one side of the table to the other. Owing to the use of the hopper we are also enabled to bring the two rolls $a$ and $b$ quite close to each other, which prevents the hardening and chilling of the glass before the welding takes place.

Having thus described our invention, what we claim and desire to secure by Letters Patent is:

1. In the manufacture of wire-glass, the process of embedding wire-netting therein consisting in pouring the glass in a single batch, discharging the batch simultaneously into two even separate and unformed parts, rolling the wire-netting into one batch and rolling the other batch at welding heat on top of the wire-netting.

2. In the manufacture of wire-glass, the combination of a table, a multiplicity of rolls, and a hopper adapted to deliver molten glass simultaneously in front of each of the rolls.

3. In the manufacture of wire-glass, the combination of a table, a multiplicity of rolls, and a hopper having a dividing bottom and aperture adapted to deliver the glass in front of more than one of the rolls.

4. In the manufacture of wire-glass, the combination of a table, a multiplicity of rolls, a hopper mounted on the rolls and having a V-shaped bottom and doors adapted to deliver molten glass in the path of more than one of the rolls.

5. In the manufacture of wire-glass, the combination of a table, one or more rolls, and a hopper for delivering glass in front of the rolls, the hopper having a dividing bottom and a carbonaceous lining.

6. In the manufacture of wire-glass, the combination of a table, a multiplicity of rolls, a chute for delivering wire netting in front of one of the rolls, and a hopper carried by the rolls and adapted to deliver portions of glass in front of more than one of the rolls.

In testimony whereof, we have hereunto set our hands.

CHARLES APPLE.
WILLIAM BUTTLER.

Witnesses:
J. M. MARKLEY,
MITTIE MITCHELL.